(12) United States Patent
Kashima et al.

(10) Patent No.: US 7,392,073 B2
(45) Date of Patent: Jun. 24, 2008

(54) TERMINAL APPARATUS

(75) Inventors: Yukiro Kashima, Takatsuki (JP); Katsuhiko Tokuda, Toyono-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/529,878

(22) PCT Filed: Sep. 29, 2003

(86) PCT No.: PCT/JP03/12394

§ 371 (c)(1),
(2), (4) Date: Apr. 1, 2005

(87) PCT Pub. No.: WO2004/032354

PCT Pub. Date: Apr. 15, 2004

(65) Prior Publication Data

US 2006/0009263 A1    Jan. 12, 2006

(30) Foreign Application Priority Data

Oct. 3, 2002  (JP)  ............................. 2002-290925

(51) Int. Cl.
*H04M 1/00*  (2006.01)

(52) U.S. Cl. ................. 455/575.7; 455/90.3; 455/558; 174/66

(58) Field of Classification Search ............... 455/558, 455/90.3, 550.1, 575.7, 575.8; 174/66
See application file for complete search history.

(56) References Cited

U.S. PATENT DOCUMENTS

| | | | |
|---|---|---|---|
| 5,559,501 A | | 9/1996 | Barzegar et al. |
| 5,970,402 A | * | 10/1999 | Vermeer ..................... 455/347 |
| 6,191,741 B1 | * | 2/2001 | Gauld et al. ................ 343/702 |
| 6,456,245 B1 | * | 9/2002 | Crawford .................... 343/702 |
| 6,473,042 B1 | * | 10/2002 | Fang et al. .......... 343/700 MS |
| 6,518,927 B2 | * | 2/2003 | Schremmer et al. ........ 343/702 |
| 6,522,299 B2 | * | 2/2003 | Beard et al. ................ 343/702 |
| 6,535,172 B2 | * | 3/2003 | Hirabayashi ................ 343/725 |
| 6,535,748 B1 | * | 3/2003 | Vuorio et al. ............ 455/552.1 |
| 6,545,643 B1 | * | 4/2003 | Sward et al. ................ 343/702 |
| 6,577,500 B2 | * | 6/2003 | Paredes et al. .............. 361/686 |
| 6,583,765 B1 | * | 6/2003 | Schamberger et al. ...... 343/770 |
| 6,611,511 B1 | * | 8/2003 | Schulz ........................ 370/342 |
| 6,636,181 B2 | * | 10/2003 | Asano et al. ............... 343/702 |
| 6,639,563 B1 | * | 10/2003 | Gu .............................. 343/702 |

(Continued)

FOREIGN PATENT DOCUMENTS

CN    1324125    11/2001

(Continued)

*Primary Examiner*—Lana N. Le
*Assistant Examiner*—April S Guzman
(74) *Attorney, Agent, or Firm*—Wenderoth, Lind & Ponack, L.L.P.

(57) ABSTRACT

Terminal equipment has mounted thereon a wireless module including a communication device having a transmission and reception antenna for connection to a wireless network and includes a first antenna unit which is connected to the transmission and reception antenna physically or spatially and a second antenna unit which is connected to the first antenna unit and transmits and receives radio signals directly to and from the wireless network such that not only communication quality is upgraded, but a radio signal reach distance between the terminal equipment and the wireless network is extended.

6 Claims, 3 Drawing Sheets

U.S. PATENT DOCUMENTS

| | | | |
|---|---|---|---|
| 6,650,296 B2* | 11/2003 | Wong et al. | 343/700 MS |
| 6,720,925 B2* | 4/2004 | Wong et al. | 343/700 MS |
| 6,720,927 B2* | 4/2004 | Bakker et al. | 343/702 |
| 6,768,460 B2* | 7/2004 | Hoashi et al. | 343/700 MS |
| 6,768,896 B2* | 7/2004 | Tjalldin et al. | 455/11.1 |
| 6,806,840 B2* | 10/2004 | Hung et al. | 343/752 |
| 6,807,432 B2* | 10/2004 | Hwang | 455/558 |
| 6,928,302 B1* | 8/2005 | Kinney et al. | 455/558 |
| 6,933,896 B2* | 8/2005 | Sward et al. | 343/702 |
| 6,959,209 B2* | 10/2005 | Fang | 455/571 |
| 6,966,782 B2* | 11/2005 | Wang et al. | 439/65 |
| 2001/0043160 A1* | 11/2001 | Hirai et al. | 343/702 |
| 2002/0002061 A1* | 1/2002 | Miyasaka et al. | 455/557 |
| 2002/0013162 A1* | 1/2002 | Whitney | 455/557 |
| 2002/0034966 A1* | 3/2002 | Saito et al. | 455/558 |
| 2002/0113741 A1 | 8/2002 | Asano et al. | |
| 2002/0118507 A1* | 8/2002 | Paredes et al. | 361/684 |
| 2002/0118508 A1* | 8/2002 | Paredes et al. | 361/686 |
| 2003/0047341 A1* | 3/2003 | Ishikawa et al. | 174/66 |
| 2003/0092396 A1* | 5/2003 | Fifield | 455/80 |
| 2003/0117331 A1* | 6/2003 | Schamberger et al. | 343/770 |
| 2003/0208629 A1* | 11/2003 | Parkman | 709/250 |
| 2003/0210199 A1* | 11/2003 | Sward et al. | 343/795 |
| 2004/0180692 A1* | 9/2004 | Yang et al. | 455/557 |
| 2004/0229478 A1* | 11/2004 | Chen | 439/11 |
| 2005/0079892 A1* | 4/2005 | De Vos et al. | 455/558 |
| 2005/0090284 A1* | 4/2005 | Yuanzhu | 455/558 |

FOREIGN PATENT DOCUMENTS

| | | |
|---|---|---|
| EP | 0 696 855 | 2/1996 |
| JP | 8-107369 | 4/1996 |
| JP | 10-340142 | 12/1998 |
| JP | 2001-337741 | 12/2001 |
| JP | 2002-217800 | 8/2002 |

* cited by examiner

TERMINAL APPARATUS

TECHNICAL FIELD

The present invention relates to terminal equipment (a terminal device) provided with a wireless interface.

BACKGROUND ART

Recently, the use of a wireless LAN (local area network) has expanded rapidly thanks to its convenience of requiring no connection cable. Thus, as disclosed in, for example, Japanese Patent Laid-Open Publication No. 8-107369 (1996), the wireless LAN attracts wide attention not only for its use as a so-called TCP/IP (Transmission Control Protocol/Internet Protocol) connection, but its use as an audio and video transmission interface. Meanwhile, at present, the frequency used in the wireless LAN is shifting from a 2.4 GHz-band to a 5 GHz-band which enables higher-capacity transmission.

Hereinafter, conventional terminal equipment provided with a wireless interface is described with reference to FIGS. 5 and 6. FIG. 5 is a schematic fragmentary side sectional view of the conventional terminal equipment provided with the wireless interface and FIG. 6 is a fragmentary perspective view of a rear portion of the conventional terminal equipment of FIG. 5. In FIGS. 5 and 6, the conventional terminal equipment includes a wireless module 10, a printed circuit board 4 and a housing 5 having a rear panel formed with a slot 9 for fitting the wireless module 10 thereinto. The wireless module 10 further includes a wireless module body 1, a communication means such as a built-in antenna 2 which is provided at one end portion of the wireless module body 1 so as to transmit and receive radio signals to and from a wireless network to be connected to the terminal equipment and a Personal Computer Memory Card International Association (PCMCIA) connector 3 which is provided at the other end portion of the wireless module body 1 so as to be connected to the terminal equipment when the wireless module 10 has been fitted into the slot 9 of the housing 5. As shown in FIG. 6, when the wireless module 10 has been fitted into the slot 9 of the rear panel of the housing 5, the built-in antenna 2 of the wireless module 10 is projected out of the slot 9 on a rear face of the housing 5.

The operation of the conventional terminal equipment provided with the wireless interface, which has the above described arrangement, is now described. A modulated wave transmitted from the wireless network to be connected to the terminal equipment is received by the built-in antenna 2 provided on the wireless module 10 and is converted into a baseband signal after its demodulation in the wireless module 10. Thereafter, via the PCMCIA connector 3 provided on the printed circuit board 4 of the terminal equipment, the baseband signal is subjected to processing based on a predetermined protocol by a signal processing circuit formed on the printed circuit board 4 of the terminal equipment and is converted into desired digital data. At the time of transmission from the terminal equipment to the wireless network, the operation is performed in the reverse sequence of the above-mentioned one.

However, in the conventional terminal equipment referred to above, since the wireless module 10 is fitted into the slot 9 of the rear panel of the housing 5 of the terminal equipment, transmission and reception radio waves are likely to be intercepted by the housing 5 when the terminal equipment performs transmission and reception with the wireless network. Meanwhile, the conventional terminal equipment has disadvantages in that since the increase in gain of the built-in antenna 2 and the transmission power of the wireless module 10 are limited by the physical and electrical restraints of the PCMCIA interface, it is difficult to secure communication quality and extend a radio signal reach distance between the terminal equipment and the wireless network.

SUMMARY OF THE INVENTION

The present invention has for its object to provide, with a view to eliminating the above-mentioned drawbacks of the prior art, terminal equipment (a terminal device) in which performance of a built-in antenna of a wireless module is raised easily.

In order to accomplish this object of the present invention, terminal equipment of the present invention has mounted thereon a wireless module including a communication device having a transmission and reception antenna for connection to a wireless network. The terminal equipment includes a first antenna unit which is connected to the transmission and reception antenna physically or spatially and a second antenna unit which is connected to the first antenna unit and transmits and receives radio signals directly to and from the wireless network.

BEST MODE FOR CARRYING OUT THE INVENTION

Hereinafter, one embodiment of the present invention is described with reference to the drawings.

First Embodiment

Figure 1:
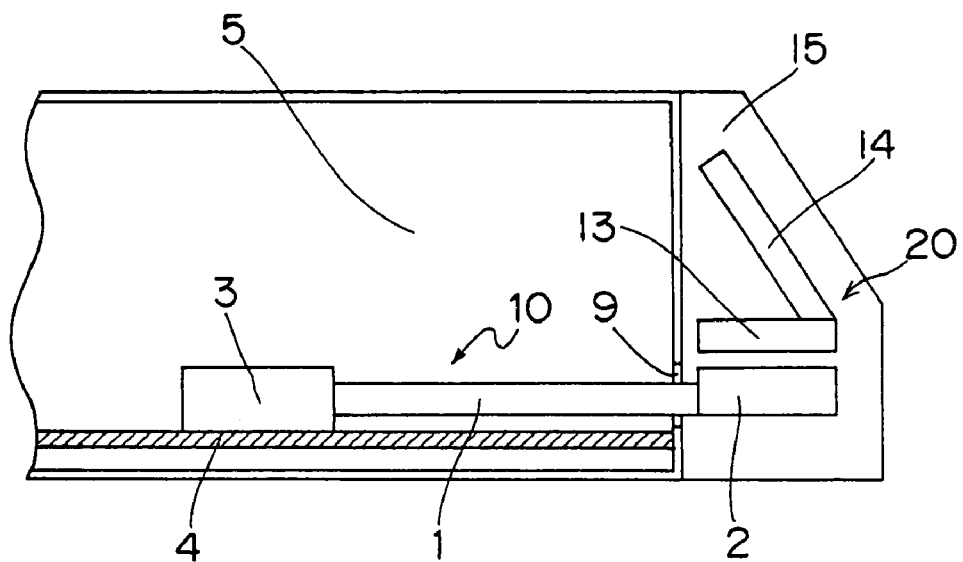
FIG. 1 is a schematic fragmentary side sectional view of terminal equipment according to a first embodiment of the present invention.
Figure 2:
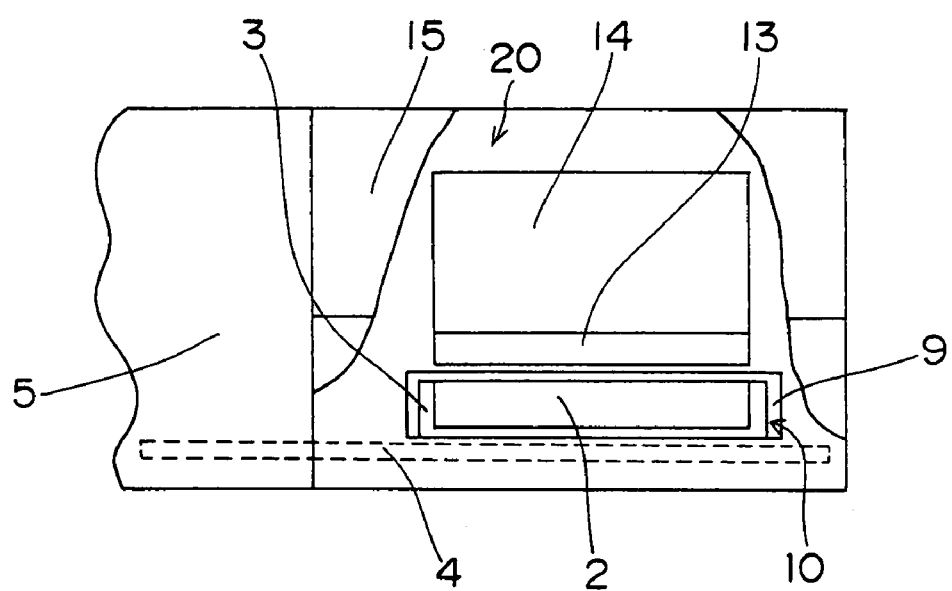
FIG. 2 is a cutaway fragmentary front elevational view of the terminal equipment of FIG. 1.
Figure 3:
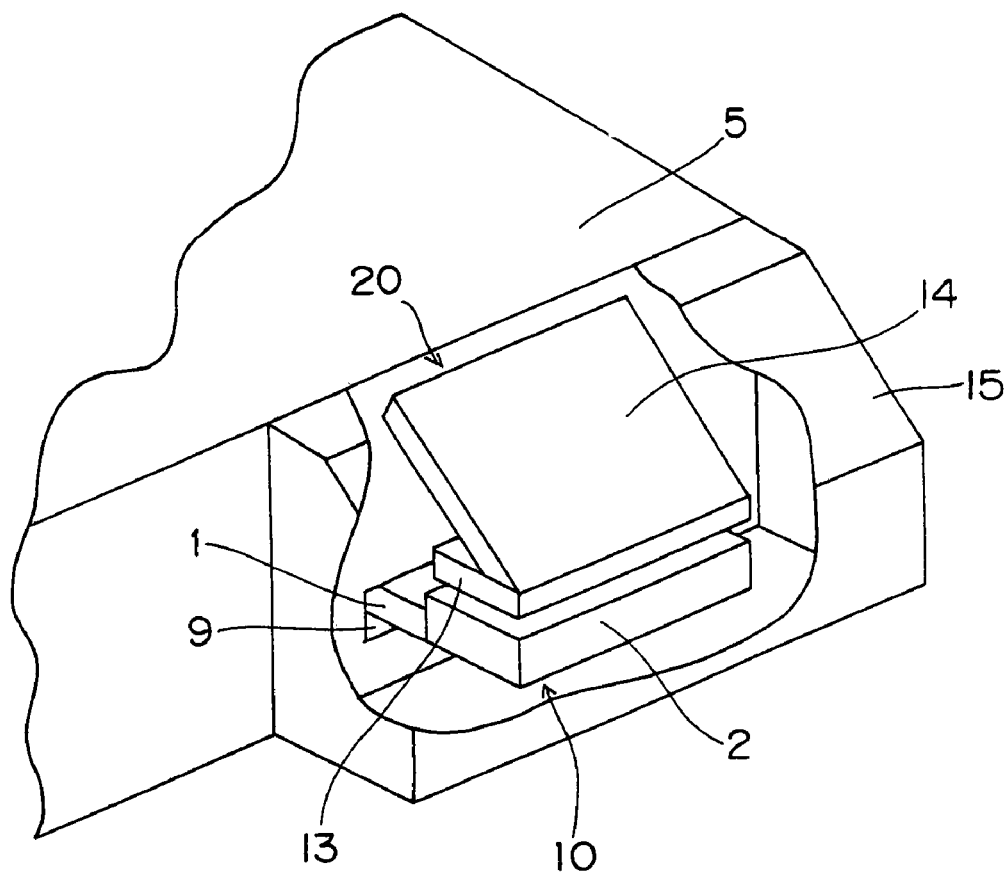
FIG. 3 is a cutaway fragmentary perspective view of a front portion of the terminal equipment of FIG. 1.

FIG. 1 is a schematic fragmentary side sectional view of terminal equipment (a terminal device) according to a first embodiment of the present invention, FIG. 2 is a cutaway fragmentary front elevational view of the terminal equipment of FIG. 1 and FIG. 3 is a cutaway fragmentary perspective view of a front portion of the terminal equipment of FIG. 1.

In FIGS. 1 to 3, in the same manner as a conventional terminal equipment, this terminal equipment includes a wireless module 10, a printed circuit board 4 and a housing 5 formed with a slot 9 for fitting the wireless module 10 thereinto. The card type wireless module 10 having an interface function includes a wireless module body 1, a communication means such as a built-in antenna 2 which is provided at one end portion of the wireless module body 1 so as to transmit and receive radio signals to and from a wireless network to be connected to the terminal equipment and a PCMCIA connector 3 which is provided at the other end portion of the wireless module body 1 so as to be connected to the terminal equipment when the wireless module 10 has been fitted into the slot 9 of the housing 5.

Figure 5:
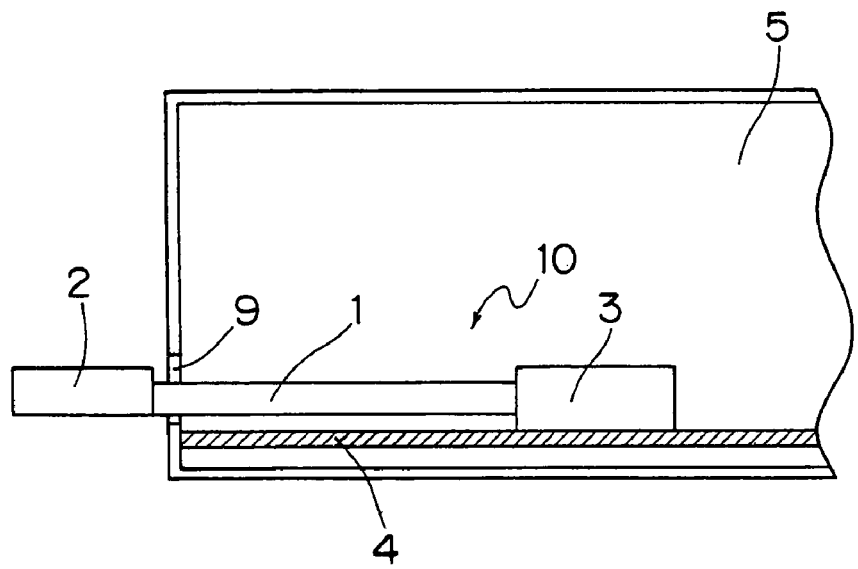
FIG. 5 is a schematic fragmentary side sectional view of prior art terminal equipment provided with a wireless interface.
Figure 6:
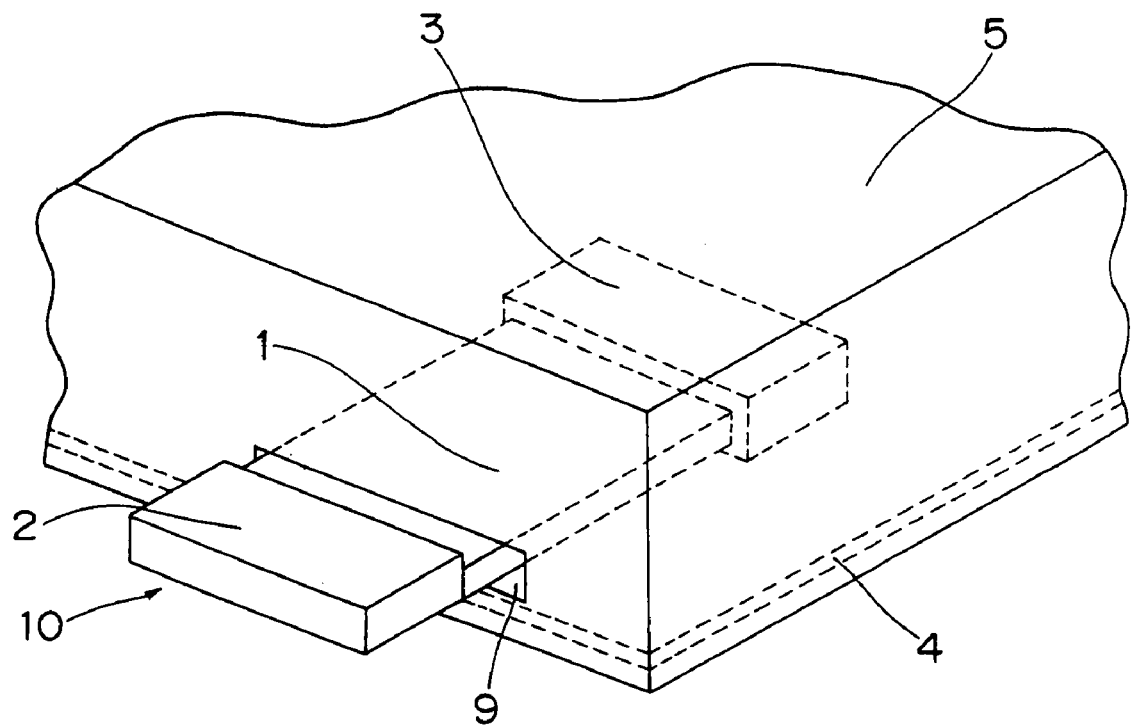
FIG. 6 is a fragmentary perspective view of a rear portion of the prior art terminal equipment of FIG. 5.

In contrast with the conventional terminal equipment of FIGS. 5 and 6 in which the slot 9 is formed on a rear panel of the housing 5, the slot 9 is formed on a front panel of the housing 5 in the terminal equipment of the present invention. Thus, as shown in FIGS. 1 and 3, when the wireless module 10 has been fitted into the slot 9 of the front panel of the housing 5, the built-in antenna 2 of the wireless module 10 is projected out of the slot 9 on the front panel of the housing 5. Furthermore, in contrast with the conventional terminal equipment of FIGS. 5 and 6, the terminal equipment of the present invention includes an antenna device 20 composed of first and second antenna units 13 and 14, and a cover 15 for accommodating the built-in antenna 2 of the wireless module 10 fitted into the slot 9 and the antenna device 20, which is attached to the front panel of the housing 5. The first antenna unit 13 is connected to the built-in antenna 2 physically or spatially so as to perform transmission and reception with the built-in antenna 2, while the second antenna unit 14 is connected to the first antenna unit 13 so as to transmit and receive radio signals directly to and from the wireless network to be connected to the terminal equipment.

The operation of the terminal equipment of the above described arrangement is now described. A modulated wave transmitted from the wireless network to be connected to the terminal equipment is initially received by the second antenna unit 14 in the cover 15 attached to the front panel of the housing 5 of the terminal equipment and is guided to the first antenna unit 13. Since the first antenna unit 13 is electromagnetically coupled to the built-in antenna 2 of the wireless module 10 fitted into the slot 9, the modulated wave is delivered into the wireless module 10 so as to be converted into a baseband signal. Thereafter, via the PCMCIA connector 3 provided on the printed circuit board 4 of the terminal equipment, the baseband signal is subjected to processing based on a predetermined protocol by a signal processing circuit formed on the printed circuit board 4 of the terminal equipment and is converted into desired digital data. At the time of transmission from the terminal equipment to the wireless network, the operation is performed in reverse of the above-mentioned sequence.

As described above, since the first antenna unit 13 for performing transmission and reception with the built-in antenna 2 of the wireless module 10 and the second antenna unit 14 for performing transmission and reception with the wireless network to be connected to the terminal equipment are disposed at a location where radio waves are least likely to be intercepted, for example, the front panel of the housing 5 of the terminal equipment, communication quality can be upgraded easily.

Meanwhile, in this embodiment, the PCMCIA connector 3 is used as an interface of the wireless module 10, but it is needless to say that the same effects can be gained even if other interfaces, such as a Secure Digital (SD) card and a Memory Stick, are used. Furthermore, elements of various types and shapes such as a dielectric, a slot and a patch can be used as the first and second antenna units 13 and 14 and the degree of freedom in design of dimensions and layout of the first and second antenna units 13 and 14 is quite high.

Figure 4:
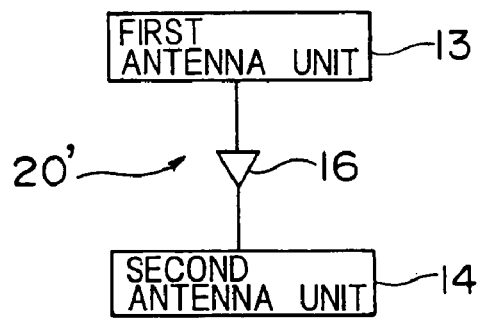
FIG. 4 is a block diagram showing an antenna device employed in terminal equipment which is a modification of the terminal equipment of FIG. 1.

In FIG. 4 showing an antenna device 20' of terminal equipment which is a modification of the terminal equipment of FIG. 1, a high-frequency amplifier circuit 16 having a gain of 1 or more is inserted between the first and second antenna units 13 and 14.

Meanwhile, the first and second antenna units 13 and 14 may also be fixed to an openable cover.

As is clear from the foregoing description of the present invention, since the first antenna unit for performing transmission and reception with the built-in antenna of the wireless module and the second antenna unit for performing transmission and reception with the wireless network to be connected to the terminal equipment are disposed at the location where radio waves are least likely to be intercepted, for example, the front panel of the housing of the terminal equipment, it is possible to upgrade communication quality and extend a radio signal reach distance between the terminal equipment and the wireless network. In addition, it is possible to easily upgrade such properties as directivity and gain in the first and second antenna units provided at the location which is comparatively free from physical or electrical restrictions, for example, the front panel of the housing of the terminal equipment.

Meanwhile, in the present invention, if the high-frequency amplifier circuit is inserted between the first and second antenna units, transmission power and a carrier-to-noise ratio (C/N) for reception are improved, so that communication quality can be further upgraded.

The invention claimed is:

1. A terminal device for connecting to a wireless network, the terminal device comprising:
 a housing having a front panel including a slot therein for receiving a wireless module including a transmission and reception antenna, the transmission and reception antenna being located outside of the housing when the wireless module is received in the slot;
 a first antenna unit for connection to the transmission and reception antenna physically or spatially;
 a second antenna unit connected to the first antenna unit so as to be connected to the transmission and reception antenna via the first antenna unit, the second antenna unit for transmitting and receiving radio signals directly to and from the wireless network; and
 a cover for accommodating the transmission and reception antenna when the wireless module is received in the slot, the first antenna unit, and the second antenna unit, the cover being attached to the front panel of the housing, wherein
 the first and second antenna units each have a first end and a second end,
 the second end of the first antenna unit is farther away from the housing than the first end of the first antenna unit, and
 the second end of the first antenna unit is connected to the first end of the second antenna unit.

2. The terminal device according to claim 1, wherein the second end of the second antenna unit is closer to the housing that the first end of the second antenna unit.

3. The terminal device according to claim 2, wherein the second end of the second antenna unit is open ended.

4. A terminal device for connecting to a wireless network, the terminal device comprising:
 a housing having a front panel including a slot therein;
 a wireless module including a transmission and reception antenna, the wireless module passing through the slot whereby the transmission and reception antenna is located outside of the housing;

a first antenna unit physically or spatially connected to the transmission and reception antenna;

a second antenna unit connected to the first antenna unit so as to be connected to the transmission and reception antenna via the first antenna unit, the second antenna unit for transmitting and receiving radio signals directly to and from the wireless network; and a cover accommodating the transmission and reception antenna, the first antenna unit, and the second antenna unit, the cover being attached to the front panel of the housing, wherein the first and second antenna units each have a first end and a second end, the second end of the first antenna unit is farther away from the housing than the first end of the first antenna unit, and the second end of the first antenna unit is connected to the first end of the second antenna unit.

5. The terminal device according to claim 4, wherein the second end of the second antenna unit is closer to the housing that the first end of the second antenna unit.

6. The terminal device according to claim 5, wherein the second end of the second antenna unit is open ended.

* * * * *